Aug. 4, 1959  A. J. FITZGERALD  2,897,927
JOINTURE BETWEEN MEMBERS OF A PREFABRICATED STRUCTURE
Filed May 19, 1955
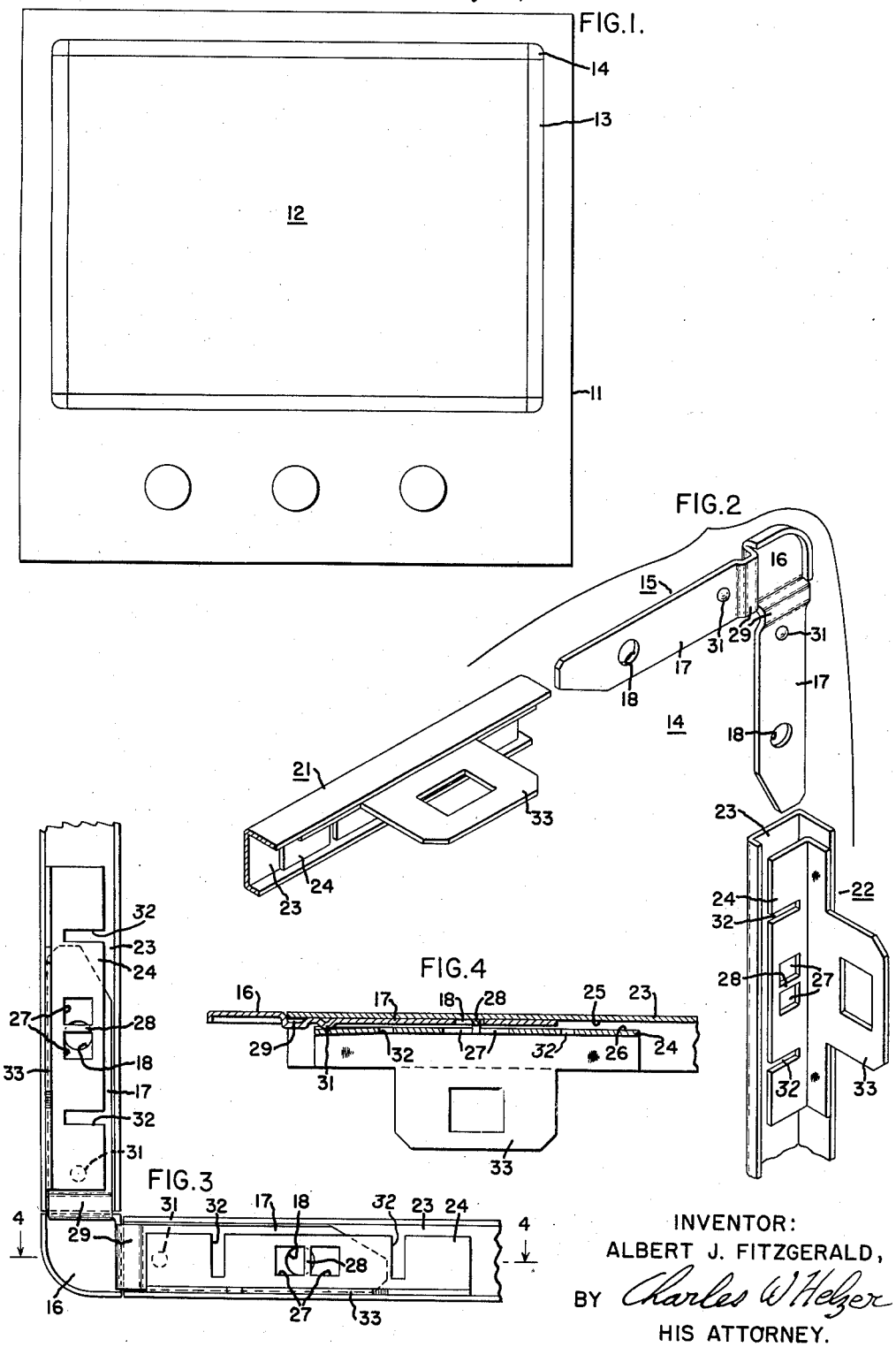
INVENTOR:
ALBERT J. FITZGERALD,
BY Charles W. Helzer
HIS ATTORNEY.

United States Patent Office 2,897,927
Patented Aug. 4, 1959

2,897,927

JOINTURE BETWEEN MEMBERS OF A PRE-FABRICATED STRUCTURE

Albert J. Fitzgerald, Syracuse, N.Y., assignor to General Electric Company, a corporation of New York Application May 19, 1955, Serial No. 509,573

2 Claims. (Cl. 189—36)

This invention relates to a jointure for structural members.

More particularly, the invention relates to a jointure for decorative structural members which is pleasing in appearance and sturdy in construction.

In the manufacture of glass enclosed viewing screens such as are used on television sets, or other objects to be viewed, it is usually desired to retain the glass in position with a retaining structure which is of sturdy, dependable construction, and yet is pleasing in appearance. Heretofore, jointures incorporating both of these features have not been readily obtainable.

It is therefore one object of the present invention to provide a jointure for structural members that is easily assembled, and sturdy in construction.

Another object of the invention is to provide a jointure for structural members which is pleasing in appearance and has no externally visible securing means such as nuts, bolts, and the like.

A still further object of the invention is to provide jointures for structural members having the above-set-forth features which is comparatively simple in design and inexpensive to manufacture.

In practicing the invention, a prefabricated jointure for structural members is provided which comprises a first structural member having at least one tongue portion with an opening therein. A second structural member adapted to cooperate with the first structural member is also provided, and has two opposing surfaces therein which define a slot for receiving the tongue portions of the first structural member. The second structural member also has holes in one of the portions thereof which comprises one of the said two opposing surfaces which holes define a retaining strap. The retaining strap is located so that it is adjacent the opening in the said tongue portion of the first structural member upon the first and second structural members being assembled together, and is adapted to be deformed into the opening to firmly secure the structural members in assembled relation. If desired, temporary holding means may be formed on at least one of the coacting surfaces of one of the said structural members for temporarily holding the structural members in assembled relation for the purpose of facilitating assembling of the jointure. Also, it is preferred that a recessed area be formed along the juncture of the tongue portion with the body of said first structural member, which recessed area accommodates burrs on the edge of the abutting second structural member so as to provide a flush-surface jointure having a pleasing appearance.

Other objects, features and many of the attendant advantages of this invention will be appreciated more readily as the same becomes understood by reference to the following detailed description, when considered in connection with the accompanying drawings, wherein like parts in each of the several figures are identified by the same reference character, and wherein:

Fig. 1 is a front view of a table model television set utilizing decorative structural members held in assembled relation by a jointure constructed in accordance with the present invention;

Fig. 2 is a perspective view of the disassembled members comprising a jointure constructed in accordance with the invention, and illustrates the desired positioning of the members for ready assembling;

Fig. 3 is a plan view of an assembled jointure constructed in accordance with the invention as viewed from the rear of such jointure; and Fig. 4 is a side view of an assembled jointure illustrating the manner in which the members thereof cooperate.

Fig. 1 of the drawing possesses a conventional appearing table model television set 11 having a viewing screen 12 which is retained in position by a suitable frame 13 held in assembled relation by a jointure 14 constructed in accordance with the present invention.

An exploded perspective view of the jointure 14 is shown in Fig. 2 of the drawing wherein it can be seen that the jointure comprises a first structural member 15 made up of a raised corner piece portion 16 and two tongue portions 17 attached to the corner piece 16 at right angles to each other. The tongue portions each have openings 18 therein which are preferably circular in configuration, as shown, but if desired, may be V-shaped or some other configuration which will produce a desired drawing up effect to be described more fully hereinafter.

The jointure further comprises second and third structural members 21 and 22 each of which is made up of two portions 23 and 24 which have opposing surfaces indicated at 25 and 26 in Fig. 4 of the drawings that define a slot for receiving a tongue portion 17 of the first structural member. While the two portions 23 and 24 of the second and third structural members are shown as comprising two separate parts which are welded together, they may be fabricated from a single piece of metal and folded together to accomplish the same result. The portion 24 of each of the second and third structural members has spaced apart holes 27 formed therein which define a retaining strap 28. The retaining strap 28 is positioned adjacent to but off-set from the center of the opening 18 in a respective tongue portion of the first structural member 15 upon the structural members being assembled together in the manner illustrated in Fig. 3 of the drawings. By constructing the retaining strap 28 in this manner, the strap will serve to draw the structural members together in a firm fashion upon the retaining strap being punched down or deformed into the opening 18 in its respective associated tongue portion of the first structural member. This drawing up action is due to the fact that the angularity of the sides of the opening, whether that opening be circular in configuration as shown or whether it is V-shaped or some other configuration, causes the tongue portion to slide toward the retaining strap upon the retaining strap being deformed into the opening. After this action has been completed the retaining strap then of course serves to permanently hold the structural members in assembled relation. In order to facilitate assembling of the jointure, temporary holding means are provided which comprise a small lug or boss 31 punched out on the coacting surface of one of the structural members upon assembling, preferably in each of the tongue portions of the first structural members 15. This lug then engages the coacting surfaces of one of the other structural members in the manner shown in Fig. 4 of the drawings to temporarily retain the structural members in assembled relation. This assembling operation is facilitated by forming cuts 32 on each side of the retaining strap 28 in the portion 24 of the second and third structural members. The cuts in the structural members allow sufficient flexing of this portion of the second and third structural members to make assembly relatively easy, and to assure that the members are not off-set one from the other in an undesirable fashion so as to distort the frame as a whole upon the members being assembled into the completed structure. The cuts 32 are placed on each end of the portions 24 to facilitate construction and a subsequent assembling of this portion of the second and third structural members in that no great care need be exercised regarding the placement of a particular end upon assembling the two portions 23 and 24 together, thus simplifying handling of these parts.

For the purpose of assuring a pleasing appearance to the completed jointure a depressed area 29 is formed along the juncture of the tongue portions 17 with the raised corner piece 16 of the first structural member 15. This depressed area accommodates any burred edges that might be formed on the abutting end of the second or third structural members, upon all of the members being assembled together in the manner shown in Fig. 4 of the drawings. By constructing this recessed area 29 in this fashion, the ends of the second and third structural members need not be ground or otherwise finished, yet the abutting ends will be allowed to form flush outer surfaces which enhance the appearance of the assembled jointure.

Upon completion of assembling of an entire frame construction in the manner described, the frame is then supported over the face of the television receiver, or other viewing objects by means of the ears 33 on each of the second and third structural members. These ears have an opening therein for receiving spring clamps to secure the frame to the television receivers face or other viewing object.

From the foregoing description it can be appreciated that the invention provides a decorative jointure that is easily assembled and sturdy in construction, yet is pleasing in appearance. The jointure has no externally visible securing means to mar its appearance, and is comparatively simple in design and inexpensive to manufacture.

Obviously, there are modifications and variations of the invention possible in the light of the above description. It is therefore to be understood that changes may be made in the particular embodiment of the invention disclosed which are within the full intended scope of the invention as defined by the appended claims.

What I claim as new and desire to secure by Letters Patent of the United States is:

1. A frame comprising a plurality of channel shaped sheet metal side members connected by corner members, each corner member including a pair of angularly extending sheet metal tongues and a stop adjacent the base of each tongue, respective tongue engaging means secured along the length of each side member adjacent an end thereof and including a sheet metal flange member spaced parallel to an interior surface of the side member to define with said surface a tongue-receiving slot, each tongue extending into a respective slot with the corresponding stop facing the adjacent end of the respective side member, each said tongue having an aperture having side edges inclined toward each other in the direction of the extremity of the tongue, tongue locking means including a pair of spaced openings in each flange member defining therebetween an integral strap narrower than a corresponding tongue aperture, each said strap being in registry with said inclined edges of said tongue aperture and being deformed into said aperture in camming engagement with said inclined edges to draw together the end of the side member and the opposing stop, and an outstanding boss on the tongue resiliently engaging said flange member to prevent play of said tongue in said slot.

2. A frame comprising a plurality of channel shaped sheet metal side members connected by corner members, each corner member including a pair of angularly extending sheet metal tongues and a stop adjacent the base of each tongue, respective tongue engaging means secured along the length of each side member adjacent an end thereof and including a sheet metal flange member spaced parallel to an interior surface of the side member to define with said surface a tongue-receiving slot, each tongue extending into a respective slot with the corresponding stop engaging the adjacent end of the respective side member, each said tongue having an aperture having side edges inclined toward each other in the direction of the extremity of the tongue, tongue locking means including a pair of spaced openings in each flange member defining therebetween an integral strap narrower than a corresponding tongue aperture, each said strap being in registry with said inclined edges of said tongue aperture and being deformed into said aperture in camming engagement with said inclined edges to urge together the end of the side member and the stop engaged thereby, each flange member having a transverse notch spaced from one end thereof, the portion of said flange member between said notch and said one end forming a resilient finger, and an outstanding boss on each tongue resiliently engaging said finger to prevent play of said tongue in said slot.

References Cited in the file of this patent

UNITED STATES PATENTS

| | | |
|---|---|---|
| 1,120,695 | Davis | Dec. 15, 1914 |
| 2,254,558 | Williams | Sept. 2, 1941 |
| 2,546,187 | Harward | Mar. 27, 1951 |
| 2,588,251 | Kost | Mar. 4, 1952 |
| 2,703,159 | Van Fleet | Mar. 1, 1955 |
| 1,716,564 | Lofqvist | Aug. 30, 1955 |